Aug. 22, 1967 K. TRACHTE 3,337,008
DISK BRAKE CONSTRUCTION
Filed May 3, 1965 2 Sheets-Sheet 1

INVENTOR
KURT TRACHTE

Dicke & Craig
ATTORNEYS.

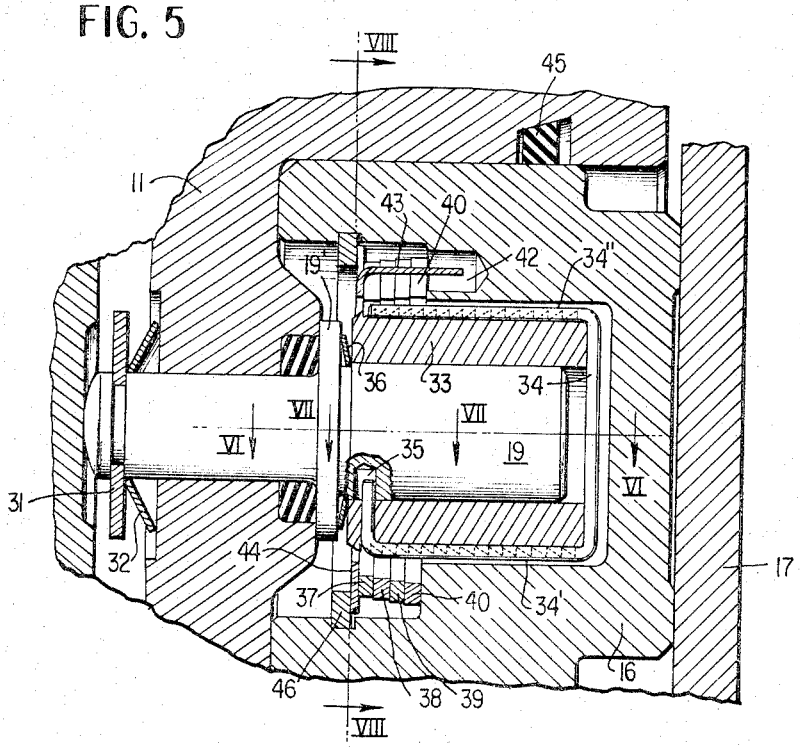
FIG. 5
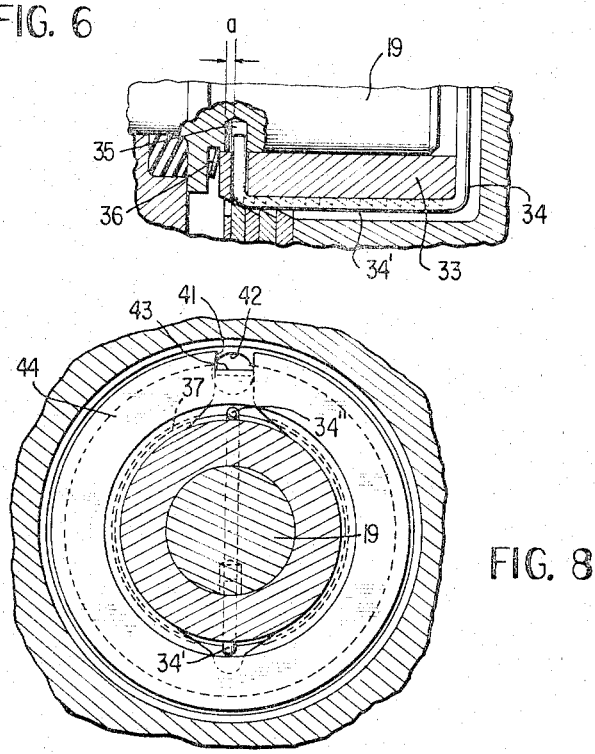
FIG. 6
FIG. 8
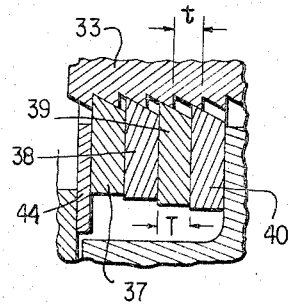
FIG. 7
INVENTOR
KURT TRACHTE
ATTORNEYS.

United States Patent Office 3,337,008
Patented Aug. 22, 1967

3,337,008
DISK BRAKE CONSTRUCTION
Kurt Trachte, Echterdingen, Germany, assignor to Daimler-Benz Aktiengesellschaft, Stuttgart-Unterturkheim, Germany
Filed May 3, 1965, Ser. No. 452,525
Claims priority, application Germany, May 2, 1964, D 44,321
15 Claims. (Cl. 188—106)

The present invention relates in general to a disk brake construction particularly for motor vehicles and especially to a brake construction of the type wherein hydraulically operated pistons are arranged at both sides of the brake disk for hydraulically pressing the stationary brake linings against the rotating brake disk.

In accordance with the instant invention, there is provided a disk brake construction which includes as an integral part thereof a mechanism for effecting purely mechanical operation, for example, by hand, as by way of the normal hand or parking brake, with the smallest additional space consumption and by the use of the same brake linings as used for the hydraulic system. For this purpose there is provided in accordance with the invention in addition to the normally provided hydraulic pistons which act on the brake linings on both sides of the brake disk, pressure pieces accommodated within the hydraulic pistons and which extend through the face end of the hydraulic cylinders which carry the pistons. These pressure pieces are in communication with the hydraulic pistons and may be operated by a mechanical actuating mechanism to actuate the hydraulic pistons manually without use of hydraulic pressure, and the inventive brake may, without difficulty, be accomplished by the use of the usual rigid saddle construction for disk brakes.

In known rigid saddle disk brakes, the back plates which carry the brake linings are provided as separate elements from the actuating members to enable the linings to be replaced easily and so bolts or guide shafts are positioned parallel to the disk axis and pass through the back plates for the brake linings so as to secure the exchangeable brake linings against radially outward movements due to centrifugal and other forces. According to one feature of the invention, a second function is assigned to these bolts in a space and weight-saving manner in which they serve at the same time as a mechanical connection between the actuating parts of the mechanical operating device for the pressure pieces provided in the hydraulic pistons on both sides of the brake disk.

The available space for disk brake housings in an axial direction is mostly limited at least in the direction toward the wheel disk, so that the additional space required for a mechanical or hand-operated brake device should therefore be as small as possible. According to the invention and for this reason, disk brakes may be constructed with a housing in which the hydraulic cylinders for the hydraulic actuating pistons are provided in such a manner that the pressure pieces accommodated therein may be actuated by a pressure lever which consists of two arms pivotally arranged at the sides of the cylinder and surrounding the cylinder at its sides, to the ends of which the operating force is applied, which force is transferred to the pressure piece by way of a connecting piece.

For the adjustment of the actuating piston with brake lining wear, a unidirectional lock between piston and pressure piece is provided to determine the relative position therebetween, which in turn determines the spacing between lining and disk since the pressure piece, by means of a spring, is pressed or pulled outwardly against an abutment on the housing which determines the rest or reference position of the pressure piece for all positions of adjustment of the piston. The adjusting device is arranged in the pressure space of the hydraulic system and is, therefore, protected against fouling. Furthermore, the position of the outer actuating lever mechanism for the pressure pieces is not changed during adjustment of the actuating piston as the brake lining wears, since the pressure pieces form the reference position for the adjustment, which is particularly advantageous in view of the usual limited space which is totally available for mounting the brake.

In the brake construction of the invention, the adjustment of the spacing between brake lining and brake disk is effected automatically during normal actuation of the hydraulic system. In order to be sure that the piston, after a hydraulic brake operation in which the adjusting device has adjusted it by exactly one locking step in the direction toward the disk, may return by the magnitude of the required clearance the invention provides that the locking elements at the side of the pressure pieces are arranged at an intermediate member which is movable in the direction of the piston movement relative to the pressure piece by an amount corresponding to the required clearance between brake lining and brake disk, the piston being movable on the intermediate member only in the direction of the brake disk. The intermediate member is therefore preferably constructed as a sleeve provided with locking teeth at its outer circumference, the relative movement of which in the hydraulic piston is limited by the bolt-like pressure piece by means of a yoke bent rectangularly around the outer surface of the sleeve with one shank portion engaging with clearance in a radial bore provided in the pressure piece. This shank portion serves as a key between the sleeve and the pressure piece allowing only slight movement therebetween.

In the locking mechanism itself, it is aimed, in the interest of providing the most accurate brake clearance at all times, to utilize the smallest possible lock step value so that brake adjustment will be very frequent. Small lock teeth, however, are expensive to produce and are subject to breakage or damage; therefore, according to the invention, a unidirectional lock is provided in which on one of the two locking members movable relative to each other, is provided as a number of teeth on the sleeve having a pitch or spacing slightly different from the corresponding teeth on the other locking member, provided as a plurality of rings resilient in the perpendicular direction to the sliding movement of the piston. In this manner, the lock steps have a magnitude equal to the rings, respectively. Singularly, it is preferred that the rigid teeth be arranged on the slidable sleeve member in the form of an outside thread with zero pitch and that the resilient teeth be provided on slotted rings which are rigidly connected in the direction of movement with the other slidable piston member.

During exchange of worn linings with new ones, it must be possible for the locking engagement between the sleeve member and the resilient rings connected to the piston to be disengaged in order to bring the pressure pieces and piston again into the original position relative to each other. With the invention, this is accomplished by making use of the already available yoke provided on the sleeve member for limiting the relative movement between sleeve and pressure piece. The yoke is thus provided with two parts parallel to each other and to the axis of the sleeve and disposed on opposite sides of the sleeve within two corresponding axial grooves in the rigid tooth construction provided on the sleeve. Thus, by rotating the bolt-like pressure piece relative to the piston, which is locked against rotation, the yoke keyed to the pressure piece will be forced against the resilient tooth rings, which themselves are secured against rotation relative to the piston, so that the toothed rings are spread apart in such a manner that the teeth become disengaged. The hydraulic piston may then be repositioned to accommodate the new brake lining and the adjusting device once again locked by again rotating the bolt-like pressure piece to engage the teeth.

It is a general object of the instant invention to provide a disk brake construction which includes as an integral part thereof a mechanism for effecting purely mechanical operation, for example, by hand.

It is another object of the instant invention to provide a disk brake construction wherein a hand operated brake mechanism is provided as an integral part thereof with the smallest additional space consumption through use of the same brake linings for both the mechanical and hydraulic systems.

It is a further object of the instant invention to provide a disk brake construction having mechanical means in addition to the normal hydraulic system to mechanically operate said brake wherein the normally provided guide shafts for the brake linings are also utilized as part of the actuating mechanism for the mechanical means.

It is still another object of the instant invention to provide a disk brake construction which includes mechanical means in addition to the normal hydraulic system to mechanically operate said brake wherein the additional mechanical means is provided in such a way as to maintain the overall axial length of the brake construction at a minimum.

It is still a further object of the instant invention to provide a disk brake construction which includes as an integral part thereof a mechanism for effecting mechanical operation of said brake and means for automatically adjusting the spacing between the brake lining and the brake disk with reference to said mechanism.

It is another object of the instant invention to provide a disk brake construction including means for effecting automatic adjustment of the spacing between the brake linings and the brake disk wherein said adjusting means is included within the hydraulic system of the brake construction to prevent fouling thereof.

It is a further object of the instant invention to provide a disk brake construction including means for effecting mechanical actuation thereof and means for effecting automatic adjustment of the spacing between the brake linings and the brake disk with reference to the mechanical means in such a way that adjustment of the brakes does not necessitate adjustment of the actuating linkage for the mechanical means.

It is yet another object of the instant invention to provide a disk brake construction including means for effecting automatic adjustment of the spacing between the brake linings and the brake disk by very fine increments without sacrificing structural strength of the mechanism.

It is yet a further object of the instant invention to provide a disk brake construction including locking means for effecting automatic adjustment of the spacing between the brake linings and the brake disc and which may be disengaged in a relatively simple manner to effect replacement of the brake linings.

These and other objects, features and advantages of the present invention will become more obvious from the following description when taken in connection with the accompanying drawing which shows, for purposes of illustration only, an exemplary embodiment in accordance with the present invention, and wherein FIGURE 1 is a cross-section through an embodiment of the disk brake construction of the present invention;

FIGURE 5 is a detailed cross-section of a portion of the brake construction illustrated in FIGURE 1;

FIGURE 6 is a section taken along line VI—VI in FIGURE 5 with the pressure piece in the rotated position;

FIGURE 7 is a section taken along line VII—VII in FIGURE 5; and

FIGURE 8 is a section taken along line VIII—VIII in FIGURE 5.

Figure 1:
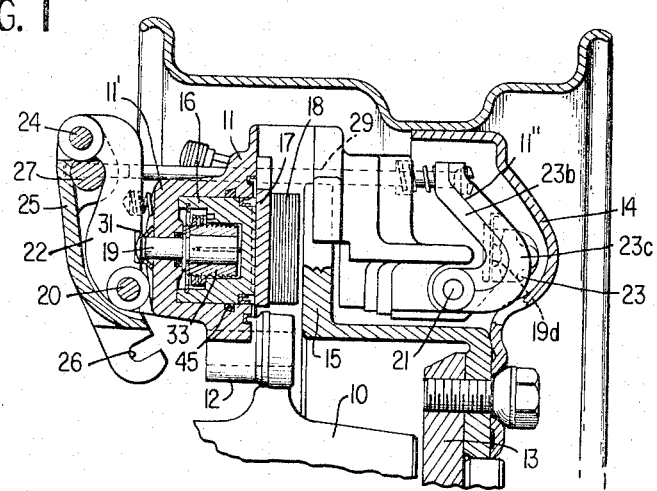
Figure 2:
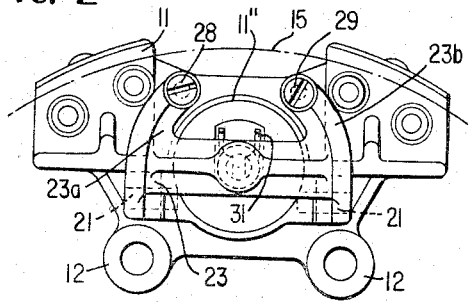
FIGURE 2 is a right side view of the construction illustrated in FIGURE 1.

Looking first to FIGURE 1, a two piece rigid saddle 11 is flanged in a customary manner to the stationary axle hub 10 with the help of eyes 12 or other conventional securing means. The wheel disk 14 and the brake disk 15 are rigidly connected with the rotating shaft flange 13 with the rotating brake disk 15 passing within the rigid saddle 11. Hydraulically operated pistons 16 are provided on both sides of the brake disk 15, which pistons may press the linings 18 attached to the back plates 17 against the brake disk 15 thereby producing the normal braking effect in the well-known manner. The pistons are arranged in cylinders, the outer contours 11' and 11" of which project outwardly from the rigid saddle housing 11.

Figure 3:
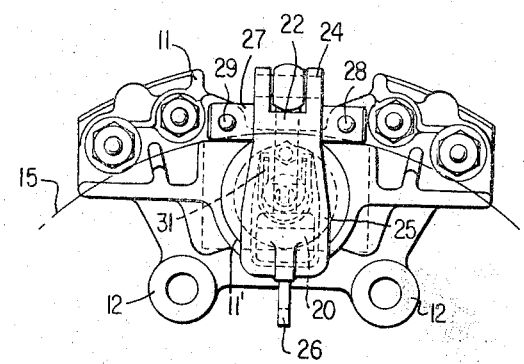
FIGURE 3 is a left side view of the construction illustrated in FIGURE 1.
Figure 4:
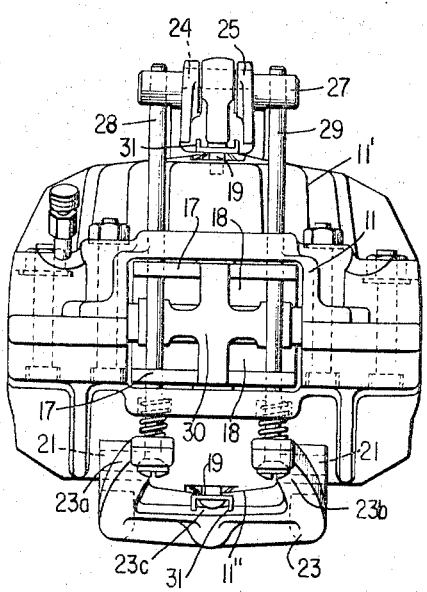
FIGURE 4 is a top plan view of the construction illustrated in FIGURE 1.

For mechanical operating of the brake, for example, by way of a hand brake, pressure pieces 19 and 19a are provided which extend through the outer faces of the cylinders and communicate with the inside surface of a hollow portion in the pistons 16 in a manner described in more detail hereinafter so that pressure on pressure pieces 19 and 19a will actuate the pistons 16. Pressure levers 22 and 23 pivotally arranged at the rigid saddle 11 at 20 and 21, respectively, serve for the loading or admission of the pressure pieces 19, which in turn actuate the pistons 16. A fork-like operating lever 25 (FIGURE 3) is pivotally arranged by means of a pivot shaft 24 at the free end of the pressure lever 22 and is provided at the other end thereof with a slot 26 or other engaging portion which engages the mechanical brake operating mechanism, for example, a pull cable (not shown) of the hand brake of a motor vehicle. The line of action of this operating force extends through the eye or screw-on portion 12 of the saddle 11 so that no moment is exerted on the saddle as a whole, during actuation of the mechanism.

At a position on the operating lever 25 adjacent to the pivot shaft 24, a bolt 27 is held into which are screwed or threaded two pull rods 28 and 29. On the other ends thereof the pull rods are inserted into the arms of the pressure lever 23 and are secured therein by means of spherical heads or any securing means. The pull rods penetrate through apertures or guide holes in the rigid saddle 11 and the back plates 17 for the brake linings, and by this means, serve as a result of being always uniformly loaded by the slightly conical construction of the support at 24, not only for the force transfer between the pressure levers 22 and 23 but also for guiding and securing the back plates 17 with the brake linings 18. For exchanging the brake linings, the rods 28 and 29 are merely unscrewed from the lever 25 and pulled out. The usual cross spring 30 which presses the back plates 17 into their position is also removed at this time. New back plates with new linings are then substituted and the pull rods are reinserted and secured once again.

The right hand brake cylinder as seen in FIGURE 1 having a contour 11' is positioned very closely adjacent to the wheel disk 14 which must for this reason be bulged out. Therefore, in order to reduce the space required by the pressure lever 23 as much as possible, the lever is constructed so as to surround with both of its arms 23a and 23b the cylinder laterally with only a connecting piece 23c passing across the pressure piece to transfer the force to the piston 16.

At the outer end of the pressure pieces 19 and 19a is positioned a clamp member 31, each rotatably rigid on the shaft portion of the pressure piece, which clamp member 31 serves as a means for turning the pressure pieces for the purpose of unlocking of the adjusting device, as will be described hereinafter, and also as contact surface for a cup spring 32, which presses the pressure piece 19 with its collar 19' against the cylinder face, as seen in FIGURE 5. A sleeve 33 is slid over the pressure piece 19 within the bore in the piston around which a yoke 34 is wound with one bent end turned inwardly in engagement with a radial bore 35 in the pressure piece 19. The sleeve may slide relative to pressure piece 19 by the amount of clearance $a$ in the bore 35 against the relatively small force of a cup spring 36 positioned on the pressure piece between abutment 19' and the sleeve 33.

Both axial portions 34' and 34" of the yoke 34 rest in axial grooves within a sawtooth-like external gear tooth system on the outer surface of the sleeve 33. Resilient rings 37 through 40 are positioned within the piston 16 surrounding the sleeve 33 and engage inwardly into the saw teeth on the sleeve 33, as seen in FIGURE 7, with the circumferential pitch or spacing $T$ of the rings being 25 percent larger than the pitch $t$ of the teeth on the sleeve 33. The tooth rings 37 through 40 are slotted at 41 (see FIGURE 8) and by means of lobe 43, of the locking plate 44, extending through these slots and engaging a bore 42 in the piston 16, the rings 37 through 40 are secured against rotational movement relative to piston 16. The piston 16, again as is well known, is secured by a lock arrangement (not shown) against rotation relative to the rigid saddle housing 11. The toothed rings 37 through 40 are also secured against axial movement relative to the piston by a snap ring 46.

During hydraulic braking, the oil to the left of the piston 16, as seen in FIGURE 5, is pressurized so that the piston 16 moves toward the brake disk 15 until the brake lining 18 makes braking contact with the rotating disk. The toothed rings 37 through 40 which move along with the piston movement must spread somewhat because the force of the cup spring 32, being greater than the axial force on the teeth of sleeve 33 produced by the spreading process, will prevent participation by the sleeve 33 and the pressure piece 19 in the movement of piston 16. When the hydraulic pressure is eliminated after terminating of the operation of braking, the piston 16 is pulled back by the resilient force by the amount of the vent clearance, for example, by an appropriate construction of the rubber seal 45.

During mechanical braking (see FIGURE 1) the operating lever 25 at its free end 26 is pulled toward the left. It first pivots about the axis 24 and thereby moves the pull rods 28 and 29 toward the left so that the pressure lever 23 is pivoted toward the left to thereby push the pressure pieces 19a inwardly. As soon as an appreciable resistance exists at these pressure pieces, bolt 20 becomes the pivot axis of the operating lever 25 and the pressure lever 22 is moved toward the right whereby the pressure piece 19 is pushed inwardly. In this way a single lever and the already existing guide rods 28 and 29 are used effectively to apply pressure to oppositely disposed pressure pieces.

With the inward movement, the collar 19' of the pressure piece overcomes the weak spring 36 and abuts (see FIGURE 5) against the face of sleeve 33 which itself transmits movement and force through tooth rings 37 through 40 to the piston 16.

The adjusting mechanism for the brake clearance functions in the following manner (see FIGURES 5 and 7). It is assumed that with a hydraulic brake, the brake lining wears by such an amount that during movement of piston 16 the tooth ring 40 eventually engages with the next tooth on the sleeve 33. When the hydraulic brake pressure is eliminated, the return adjusting force acting on piston 16, produced, for example, by the seal 45, can return the piston nevertheless by overcoming the weak spring 36 whereby, the distance between collar 19' and the face of the sleeve 33 is decreased. A minimum brake clearance is thereby assured at all times. Thanks to the differences of the tooth pitch $T$ and $t$, the brake adjustment is accomplished automatically in relatively small steps of the magnitude $T/5$ whereby one tooth ring is in engagement with a tooth on the sleeve 33 at a time. In time, the piston 16 travels relative to sleeve 33 and also relative to the pressure piece 19 further to the right until the brake lining is worn through.

During exchanging of the lining, the original condition of the adjusting position, shown in FIGURE 5, must again be established to fit the new lining in place so that the tooth locking mechanism must be unlocked at that time. In order to do this, the pressure piece 19 is rotated with the help of clamp 31 by hand through an angle of approximately 90°. Inasmuch as the piston 16 and the tooth rings are secured against rotation, as was described hereinabove, the sleeve 33 and yoke 34 must participate in the rotation on account of the engagement of the yoke 34 in bore 35 and the axial portions 34' and 34" of the yoke are slid below the beveled teeth of tooth rings 37 through 40 to spread these rings apart by such an amount that the gear teeth on sleeve 33 become disengaged. FIGURE 6 shows this condition in which axial movements between the piston 16 and the pressure piece 19 are possible in both directions. After return rotation of the pressure piece 19 into its original position, the gear teeth again engage and adjustment for the new lining is effected automatically upon actuation of the piston 16.

It is, of course, understood that a piston arrangement such as illustrated in FIGURE 5 is provided on both sides of the brake disk 15 and that each arrangement is substantially identical in configuration and operation to that described above in conjunction with FIGURES 5 through 8.

While I have shown and described a preferred embodiment in accordance with the present invention, it is understood that the same is not limited thereto but is susceptible of numerous changes and modifications within the spirit and scope thereof and I therefore do not wish to be limited to the details shown and described herein but intend to cover all such changes and modifications as are encompassed by the scope of the appended claims.

I claim:
1. A disk brake construction, particularly for motor vehicles having a stationary wheel hub and a rotating wheel axle carried thereby, comprising
   brake disk means secured to said rotating wheel axle for rotation therewith,
   brake lining means supported on said wheel hub on both sides of said brake disk means for effecting braking action on said rotating brake disk means,
   actuating piston means associated with said brake lining means including hydraulic cylinder means and an actuating piston mounted therein for effecting pressure contact between said brake lining means and said brake disk means in response to hydraulic pressure within said cylinder means,
   mechanical actuating means including a pressure piece mounted within said actuating piston and protruding to the outside of said hydraulic cylinder means for mechanically actuating said piston means through said pressure piece independently of the hydraulic pressure in said cylinder means,
   a pair of support rods mounted parallel to the axis of said brake disk means and passing through said brake lining means so as to permit only movement thereof into and out of engagement with said brake disk means in response to actuation of said actuating piston means, said support rods being connected to said mechanical actuating means thereby serving also as means for transmitting force to said pressure piece,
   housing means for supporting said actuating piston means on said wheel hub including said pair of support rods and at least one lever forming part of said mechanical actuating means being connected at one end to said support rods and being pivotally connected at the other end to said housing means, said lever including a pair of arms extending between said support rods and said housing means around the sides of said hydraulic cylinder means.

2. A disk brake construction, particularly for motor vehicles having a stationary wheel hub and a rotating wheel axle carried thereby, comprising brake disk means secured to said rotating wheel axle for rotation therewith, brake lining means supported on said wheel hub on both sides of said brake disk means for effecting braking action on said rotating brake disk means, actuating piston means associated with said brake lining means including hydraulic cylinder means and an actuating piston mounted therein for effecting pressure contact between said brake lining means and said brake disk means in response to hydraulic pressure within said cylinder means, mechanical actuating means including a pressure piece mounted within said actuating piston and protruding to the outside of said hydraulic cylinder means for mechanically actuating said piston means through said pressure piece independently of the hydraulic pressure in said cylinder means, a pair of support rods mounted parallel to the axis of said brake disk means and passing through said brake lining means so as to permit only movement thereof into and out of engagement with said brake disk means in response to actuation of said actuating piston means, said support rod being connected to said mechanical actuating means thereby serving also as means for transmitting force to said pressure piece, housing means for supporting said actuating piston means on said wheel hub including said pair of support rods and at least one lever forming part of said mechanical actuating means being connected at one end to said support rods and being pivotally connected at the other end to said housing means, said lever including a pair of arms extending between said support rods and said housing means around the sides of said hydraulic cylinder means, said mechanical actuating means being operated along a line passing substantially through the point of support of said housing means on said wheel hub so as to prevent the application of force moments to said housing.

3. A disk brake construction, particularly for motor vehicles having a stationary wheel hub and a rotating wheel axle carried thereby, comprising brake disk means secured to said rotating wheel axle for rotation therewith, brake lining means supported on said wheel hub on both sides of said brake disk means for effecting braking action on said rotating brake disk means, actuating piston means associated with said brake lining means including hydraulic cylinder means and an actuating piston mounted therein for effecting pressure contact between said brake lining means and said brake disk means in response to hydraulic pressure within said cylinder means, mechanical actuating means including a pressure piece mounted within said actuating piston and protruding to the outside of said hydraulic cylinder means for mechanically actuating said piston means through said pressure piece independently of the hydraulic pressure in said cylinder means, adjusting means positioned within said actuating piston means for maintaining a predetermined spacing between said brake lining means and said brake disk means, said adjusting means including a unidirectional locking member mounted within said actuating piston means between said actuating piston and said pressure piece for determining the relative positions therebetween and spring means for maintaining said pressure piece in a reference position with respect to said brake disk means, said unidirectional locking member being slidable in the direction of movement of said actuating piston only by an amount equal to the predetermined spacing maintained between said brake lining means and said brake disk means relative to said pressure piece, said unidirectional locking member being provided as a sleeve having a plurality of teeth on the outer surface thereof and including yoke means surrounding said sleeve and having a radial bent portion extending inwardly through said sleeve into said pressure piece.

4. A disk brake construction, particularly for motor vehicles having a stationary wheel hub and a rotating wheel axle carried thereby, comprising brake disk means secured to said rotating wheel axle for rotation therewith, brake lining means supported on said wheel hub on both sides of said brake disk means for effecting braking action on said rotating brake disk means, actuating piston means associated with said brake lining means including hydraulic cylinder means and an actuating piston mounted therein for effecting pressure contact between said brake lining means and said brake disc means in response to hydraulic pressure within said cylinder means, mechanical actuating means including a pressure piece mounted within said actuating piston and protruding to the outside of said hydraulic cylinder means for mechanically actuating said piston means through said pressure piece independently of the hydraulic pressure in said cylinder means, adjusting means positioned within said actuating piston means for maintaining a predetermined spacing between said brake lining means and said brake disk means, said adjusting means including a unidirectional locking member mounted within said actuating piston means between said actuating piston and said pressure piece for determining the relative positions therebetween and spring means for maintaining said pressure piece in a reference position with respect to said brake disk means, said unidirectional locking member being provided as a sleeve having a plurality of teeth on the outer surface thereof and including yoke means surrounding said sleeve and having a radial bent portion extending inwardly through said sleeve into said pressure piece.

5. A disk brake construction, particularly for motor vehicles having a stationary wheel hub and a rotating wheel axle carried thereby, comprising brake disk means secured to said rotating wheel axle for rotation therewith, brake lining means supported on said wheel hub on both sides of said brake disk means for effecting braking action on said rotating brake disk means, actuating piston means associated with said brake lining means including hydraulic cylinder means and an actuating piston mounted therein, for effecting pressure contact between said brake lining means and said brake disk means in response to hydraulic pressure within said cylinder means, mechanical actuating means including a pressure piece mounted within said actuating piston and protruding to the outside of said hydraulic cylinder means for mechanically actuating said piston means through said pressure piece independently of the hydraulic pressure in said cylinder means, adjusting means positioned within said actuating piston means for maintaining a predetermined spacing between said brake lining means and said brake disk means, said adjusting means including a unidirectional locking member mounted within said actuating piston means between said actuating piston and said pressure piece for determining the relative positions therebetween and spring means for maintaining said pressure piece in a reference position with respect to said brake disk means, said unidirectional locking member being provided as a sleeve having a plurality of teeth on the outer surface thereof and including yoke means surrounding said sleeve and having a radial bent portion extending inwardly through said sleeve into said pressure piece, said actuating piston means including resilient toothed means having teeth in engagement with the teeth on said sleeve, the teeth on said toothed means having a different pitch from the teeth on said sleeve.

6. A disk brake construction, particularly for motor vehicles having a stationary wheel hub and a rotating wheel axle carried thereby, comprising brake disk means secured to said rotating wheel axle for rotation therewith, brake lining means supported on said wheel hub on both sides of said brake disk means for effecting braking action of said brake disc means, actuating piston means associated with said brake lining means including hydraulic cylinder means and an actuating piston mounted therein, for effecting pressure contact between said brake lining means and said brake disk means in response to hydraulic pressure within said cylinder means, mechanical actuating means including a pressure piece mounted within said actuating piston and protruding to the outside of said hydraulic cylinder means for mechanically actuating said piston means through said pressure piece independently of the hydraulic pressure in said cylinder means, adjusting means positioned within said actuating piston means for maintaining a predetermined spacing between said brake lining means and said brake disk means, said adjusting means including a unidirectional locking member mounted within said actuating piston means between said actuating piston and said pressure piece for determining the relative positions therebetween and spring means for maintaining said pressure piece in a reference position with respect to said brake disk means, said unidirectional locking member being provided as a sleeve having a plurality of teeth on the outer surface thereof and including yoke means surrounding said sleeve and having a radial bent portion extending inwardly through said sleeve into said pressure piece, said actuating piston means including resilient toothed means having teeth in engagement with the teeth on said sleeve, the teeth on said toothed means having a different pitch from the teeth on said sleeve, said teeth on said sleeve being in the form of a rigid thread of zero pitch and said resilient toothed means being constructed as a plurality of slotted rings resilient in the radial direction and fastened within said actuating piston means so as to be rigid in the axial direction thereof.

7. A disk brake construction, particularly for motor vehicles having a stationary wheel hub and a rotating wheel axle carried thereby, comprising brake disk means secured to said rotating wheel axle for rotation therewith.

brake lining means supported on said wheel hub on both sides of said brake disk means for effecting braking action on said rotating brake disk means, actuating piston means associated with said brake lining means including hydraulic cylinder means and an actuating piston mounted therein, for effecting pressure contact between said brake lining means and said brake disk means in response to hydraulic pressure within said cylinder means, mechanical actuating means including a pressure piece mounted within said actuating piston and protruding to the outside of said hydraulic cylinder means for mechanically actuating said piston means through said pressure piece independently of the hydraulic pressure in said cylinder means, adjusting means positioned within said actuating piston means for maintaining a predetermined spacing between said brake lining means and said brake disk means, said adjusting means including a unidirectional locking member mounted within said actuating piston means between said actuating piston and said pressure piece for determining the relative positions therebetween and spring means for maintaining said pressure piece in a reference position with respect to said brake disk means, said unidirectional locking member being provided as a sleeve having a plurality of teeth on the outer surface thereof and including yoke means surrounding said sleeve and having a radial bent portion extending inwardly through said sleeve into said pressure piece, said actuating piston means including resilient toothed means having teeth in engagement with the teeth on said sleeve, the teeth on said toothed means having a different pitch from the teeth on said sleeve, said teeth on said sleeve being in the form of a rigid thread of zero pitch and said resilient toothed means being constructed as a plurality of slotted rings resilient in the radial direction and fastened within said actuating piston means so as to be rigid in the axial direction thereof, said yoke means having axially extending portions on opposite sides of said sleeve, said sleeve having axial grooves in the outer toothed surface thereof within which said axially extending portions are accommodated so as to protrude from the surface of said sleeve an extent greater than the teeth thereon.

8. A disk brake construction, particularly for motor vehicles having a stationary wheel hub and a rotating wheel axle carried thereby, comprising brake disk means secured to said rotating wheel axle for rotation therewith, brake lining means supported on said wheel hub on both sides of said brake disk means for effecting braking action on said rotating brake disk means, actuating piston means associated with said brake lining means including hydraulic cylinder means and an actuating piston mounted therein, for effecting pressure contact between said brake lining means and said brake disk means in response to hydraulic pressure within said cylinder means, mechanical actuating means including a pressure piece mounted within said actuating piston and protruding to the outside of said hydraulic cylinder means for mechanically actuating said piston means through said pressure piece independently of the hydraulic pressure in said cylinder means, a pair of support rods mounted parallel to the axis of said brake disk means and passing through said brake lining means so as to permit only movement thereof into and out of engagement with said brake disk means in response to actuation of said actuating piston means, said support rods being connected to said mechanical actuating means thereby serving also as means for transmitting force to said pressure piece, adjusting means positioned within said actuating piston means for maintaining a predetermined spacing between said brake lining means and said brake disk means.

said adjusting means including a unidirectional locking member mounted within said actuating piston means between said actuating piston and said pressure piece for determining the relative positions therebetween and spring means for maintaining said pressure piece in a reference position with respect to said brake disk means, said unidirectional locking member being provided as a sleeve having a plurality of teeth on the outer surface thereof and including yoke means surrounding said sleeve and having a radial bent portion extending inwardly through said sleeve into said pressure piece, said actuating piston means including resilient toothed means having teeth in engagement with the teeth on said sleeve, the teeth on said toothed means having a different pitch from the teeth on said sleeve.

9. A disk brake construction, particularly for motor vehicles having a stationary wheel hub and a rotating wheel axle carried thereby, comprising brake disk means secured to said rotating wheel axle for rotation therewith, brake lining means supported on said wheel hub on both sides of said brake disk means for effecting braking action on said rotating brake disk means, actuating piston means associated with said brake lining means including hydraulic cylinder means and an actuating piston mounted therein for effecting pressure contact between said brake lining means and said brake disk means in response to hydraulic pressure within said cylinder means, mechanical actuating means including a pressure piece mounted within said actuating piston and protruding to the outside of said hydraulic cylinder means for mechanically actuating said piston means through said pressure piece independently of the hydraulic pressure in said cylinder means, a pair of support rods mounted parallel to the axis of said brake disk means and passing through said brake lining means so as to permit only movement thereof into and out of engagement with said brake disk means in response to actuation of said actuating piston means, said support rods being connected to said mechanical actuating means thereby serving also as means for transmitting force to said pressure piece, housing means for supporting said actuating piston means on said wheel hub including said pair of support rods and at least one lever forming part of said mechanical actuating means being connected at one end to said support rods and being pivotally connected at the other end to said housing means, said lever including a pair of arms extending between said support rods and said housing means around the sides of said hydraulic cylinder means, said mechanical actuating means being operated along a line passing substantially through the point of support of said housing means on said wheel hub so as to prevent the application of force moments to said housing, adjusting means positioned within said actuating piston means for maintaining a predetermined spacing between said brake lining means and said brake disk means.

said adjusting means including a unidirectional locking member mounted within said actuating piston means between said actuating piston and said pressure piece for determining the relative positions therebetween and spring means for maintaining said pressure piece in a reference position with respect to said brake disk means, said unidirectional locking member being slidable in the direction of movement of said actuating piston only by an amount equal to the predetermined spacing maintained between said brake lining means and said brake disk means relative to said pressure piece, said unidirectional locking member being provided as a sleeve having a plurality of teeth on the outer surface thereof and including yoke means surrounding said sleeve and having a radial bent portion extending inwardly through said sleeve into said pressure piece, said actuating piston means including resilient toothed means having teeth in engagement with the teeth on said sleeve, the teeth on said toothed means having a different pitch from the teeth on said sleeve, said teeth on said sleeve being in the form of a rigid thread of zero pitch and said resilient toothed means being constructed as a plurality of slotted rings resilient in the radial direction and fastened within said actuating piston means so as to be rigid in the axial direction thereof, said yoke means having axially extending portions on opposite sides of said sleeve, said sleeve having axial grooves in the outer toothed surface thereof within which said axially extending portions are accommodated so as to protrude from the surface of said sleeve an extent greater than the teeth thereon.

10. A disk brake construction, particularly for motor vehicles, including rotatable brake disk means and relatively stationary brake lining means, actuating lever means for mechanically actuating said lining means against said rotatable brake disk means in response to hydraulic pressure, mechanical operating means for operating said actuating piston means independent of said hydraulic pressure, said actuating piston means including a hydraulic cylinder and a hollow piston mounted for sliding movement therein, said mechanical operating means including mechanical pressure means mounted within said hollow piston, actuating lever means for mechanically actuating said actuating piston means by means of said mechanical pressure means to shift said brake lining means into braking engagement with said rotatable brake disk means, brake adjusting means for automatically adjusting a predetermined static spacing between said brake lining means and said brake disk means positioned within the hydraulic portion of said actuating piston means, said brake adjusting means including sleeve means positioned on said mechanical pressure means within said hollow piston and unidirectional locking means associated with said hollow piston and said sleeve means for determining the static position of said hollow piston with respect to said hydraulic cylinder as determined by said mechanical pressure means, said unidirectional locking means including inclined teeth on the outer surface of said sleeve means and resilient toothed rings secured to said hollow piston in engagement with the teeth on said sleeve means so as to permit movement of said hollow piston with respect to said sleeve only in a single axial direction.

11. A disk brake construction, particularly for motor vehicles, including rotatable brake disk means and relatively stationary brake lining means, actuating piston means for forcibly pressing said brake lining means against said rotatable brake disk means in response to hydraulic pressure, mechanical operating means for operating said actuating piston means independent of said hydraulic pressure, said actuating piston means including a hydraulic cylinder and a hollow piston mounted for sliding movement therein, said mechanical operating means including mechanical pressure means mounted within said hollow piston, actuating lever means for mechanically actuating said actuating piston means by means of said mechanical pressure means to shift said brake lining means into braking engagement with said rotatable brake disk means, brake adjusting means for automatically adjusting a predetermined static spacing between said brake lining means and said brake disk means positioned within the hydraulic portion of said actuating piston means, said brake adjusting means including sleeve means positioned on said mechanical pressure means within said hollow piston and unidirectional locking means associated with said hollow piston and said sleeve means for determining the static position of said hollow piston with respect to said hydraulic cylinder as determined by said mechanical pressure means, said unidirectional locking means including inclined teeth on the outer surface of said sleeve means and resilient toothed rings secured to said hollow piston in engagement with the teeth on said sleeve means so as to permit movement of said hollow piston with respect to said sleeve only in a single axial direction, said sleeve means including yoke means for limiting relative movement between said sleeve means and said mechanical pressure means to a value equal to the desired static spacing between said brake lining means and said brake disk means.

12. A disk brake construction, particularly for motor vehicles, including rotatable brake disk means and relatively stationary brake lining means, actuating piston means for forcibly pressing said brake lining means against said rotatable brake disk means in response to hydraulic pressure, mechanical operating means for operating said actuating piston means independent of said hydraulic pressure, said actuating piston means including a hydraulic cylinder and a hollow piston mounted for sliding movement therein, said mechanical operating means including mechanical pressure means mounted within said hollow piston, actuating lever means for mechanically actuating said actuating piston means by means of said mechanical pressure means to shift said brake lining means into braking engagement with said rotatable brake disk means, brake adjusting means for automatically adjusting a predetermined static spacing between said brake lining means and said brake disk means positioned within the hydraulic portion of said actuating piston means, said brake adjusting means including sleeve means positioned on said mechanical pressure means within said hollow piston and unidirectional locking means associated with said hollow piston and said sleeve means for determining the static position of said hollow piston with respect to said hydraulic cylinder as determined by said mechanical pressure means, said unidirectional locking means including inclined teeth on the outer surface of said sleeve means and resilient toothed rings secured to said hollow piston in engagement with the teeth on said sleeve means so as to permit movement of said hollow piston with respect to said sleeve only in a single axial direction, said sleeve means including yoke means for limiting relative movement between said sleeve means and said mechanical pressure means to a value equal to the desired static spacing between said brake lining means and said brake disk means, said yoke means having axially extending portions on opposite sides of said sleeve means, said sleeve means having axial grooves in the outer toothed surface thereof within which said axially extending portions are accommodated so as to protrude from the surface of said sleeve means an extent greater than the teeth thereon.

13. A disk brake construction, particularly for motor vehicles, including rotatable brake disk means and relatively stationary brake lining means, actuating piston means for forcibly pressing said brake lining means against said rotatable brake disc means in response to hydraulic pressure, mechanical operating means for operating said actuating piston means independent of said hydraulic pressure, said actuating piston means including a hydraulic cylinder and a hollow piston mounted for sliding movement therein, said mechanical operating means including mechanical pressure means mounted within said hollow piston, actuating lever means for mechanically actuating said actuating piston means by means of said mechanical pressure means to shift said brake lining means into braking engagement with said rotatable brake disk means, brake adjusting means for automatically adjusting a predetermined static spacing between said brake lining means and said brake disk means positioned within the hydraulic portion of said actuating piston means, said brake adjusting means including sleeve means positioned on said mechanical pressure means within said hollow piston and unidirectional locking means associated with said hollow piston and said sleeve means for determining the static position of said hollow piston with respect to said hydraulic cylinder as determined by said mechanical pressure means, said unidirectional locking means including inclined teeth on the outer surface of said sleeve means and resilient toothed rings secured to said hollow piston in engagement with the teeth on said sleeve means so as to permit movement of said hollow piston with respect to said sleeve only in a single axial direction, the teeth on said sleeve means having a pitch slightly different from the pitch of the teeth on said resilient toothed rings.

14. A disk brake construction, particularly for motor vehicles, including rotatable brake disk means and relatively stationary brake lining means, actuating piston means for forcibly pressing said brake lining means against said rotatable brake disk means in response to hydraulic pressure, mechanical operating means for operating said actuating piston means independent of said hydraulic pressure, said actuating piston means including a hydraulic cylinder and a hollow piston mounted for sliding movement therein, said mechanical operating means including mechanical presure means mounted within said hollow piston, actuating lever means for mechanically actuating said actuating piston means by means of said mechanical pressure means to shift said brake lining means into braking engagement with said rotatable brake disk means, said actuating lever means including support rod means providing the sole support for said brake lining means against movement in the radial direction and at least one pivot lever connected to and actuated by said support rod means into contact with said mechanical pressure means, brake adjusting means for automatically adjusting a predetermined static spacing between said brake lining means and said brake disk means positioned within the hydraulic portion of said actuating piston means, said brake adjusting means including sleeve means positioned on said mechanical pressure means within said hollow piston and unidirectional locking means associated with said hollow piston and said sleeve means for determining the static position of said hollow piston with respect to said hydraulic cylinder as determined by said mechanical pressure means, said unidirectional locking means including inclined teeth on the outer surface of said sleeve means and resilient toothed rings secured to said hollow piston in engagement with the teeth on said sleeve means so as to permit movement of said hollow piston with respect to said sleeve only in a single axial direction, said sleeve means including yoke means for limiting relative movement between said sleeve means and said mechanical pressure means to a value equal to the desired static spacing between said brake lining means and said brake disk means, said yoke means having axially extending portions on opposite sides of said sleeve means, said sleeve means having axial grooves in the outer toothed surface thereof within which said axially extending portions are accommodated so as to protrude from the surface of said sleeve means an extent greater than the teeth thereon, the teeth on said sleeve means having a pitch slightly different from the pitch of the teeth on said resilient toothed rings.

15. A disk brake construction, particularly for motor vehicles having a stationary wheel hub and a rotating wheel axle carried thereby, comprising brake disk means secured to said rotating wheel axle for rotation therewith, brake lining means supported on said wheel hub on both sides of said brake disk means for effecting braking action on said rotating brake disk means, actuating piston means associated with said brake lining means including hydraulic cylinder means disposed on both sides of said brake disk, and an actuating piston mounted therein for effecting pressure contact between said brake lining means and said brake disk means in response to hydraulic pressure within said cylinder means, mechanical actuating means including a pressure piece mounted within said actuating piston and protruding to the outside of said hydraulic cylinder means for mechanically actuating said piston means through said pressure piece independently of the hydraulic pressure in said cylinder means, a pair of support rods mounted parallel to the axis of said brake disk means and passing through said brake lining means so as to permit only movement thereof into and out of engagement with said brake disk means in response to actuation of said actuating piston means, said support rods being connected to said mechanical actuating means thereby serving also as means for transmitting force to said pressure piece, housing means for supporting said actuating piston means on said wheel hub including said pair of support rods and at least one lever forming part of said mechanical actuating means being connected at one end to said support rods and being pivotally connected at the other end to said housing means, said lever including a pair of arms extending between said support rods and said housing means around the sides of said hydraulic cylinder means.

References Cited

UNITED STATES PATENTS

| | | | |
|---|---|---|---|
| 2,949,173 | 8/1960 | Peras | 188—73 X |
| 3,139,157 | 6/1964 | Hodkinson | 188—73 |
| 3,145,807 | 8/1964 | Desvignes et al. | 188—106 |
| 3,185,263 | 5/1965 | Schanz et al. | 188—106 |
| 3,244,260 | 4/1960 | Frayer | 188—106 |

DUANE A. REGER, *Primary Examiner.*